United States Patent Office 3,366,678
Patented Jan. 30, 1968

3,366,678
PARA XYLYLENE BIS (PHOSPHONOUS ACID) BIS (ANILINO) COMPOUNDS USEFUL AS ANTI-BACTERIAL AGENTS
Andrew T. Guttmann, Lakewood, Ohio, and Eric Jungermann, La Grange, and Warner M. Linfield, Evanston, Ill., assignors to Armour and Company, Chicago, Ill., a corporation of Delaware
No Drawing. Filed Aug. 21, 1963, Ser. No. 303,678
3 Claims. (Cl. 260—502.5)

Our invention relates to the control of bacterial growth and more particularly to an antibacterial agent and to its method of use.

The principal object of our invention is to provide an antibacterial agent which is useful, especially in combination with an ordinary soap or cleansing agent, as a bacteriostatic or antibacterial agent. Another object is to provide an antibacterial agent and a highly effective method of use thereof.

Other objects will appear as this specification proceeds.

We have discovered that certain bis-amino-phosphinic acids have definite antibacterial properties and that these antibacterial properties can be further enhanced in the presence of an alkaline agent, such as soap or any other conventional alkaline cleansing agent. Therefore, a washing operation and a treatment to inhibit bacterial growth may be undertaken in the same operation.

The bis-aminophosphinic acids which exhibit bacteriostatic properties have been found to have the general formula:

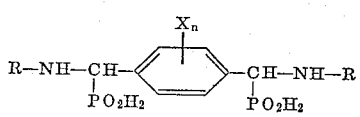

wherein R may be a substituted or unsubstituted aryl group and X is nitro, hydroxyl or halogen and $n$ is an integer of from 0 to 4 inclusive. When R is substituted, such groups as nitro, hydroxyl, and halogen may be utilized. Particularly effective results are obtained where R is phenyl, substituted by either halogen or hydroxy, although the extent of such effectiveness varies somewhat according to the degree of halogenation or hydroxylation and the spatial relationships of such groups. Better results are had when the halogen groups in R, where R is phenyl, are located in the meta or para positions rather than in the ortho position; however, with the substitution of hydroxyl on the aryl group, it has been found that substitution in the ortho position generally results in somewhat higher activity than either the meta or para positions. As set out above, X may be nitro, hydroxyl or halogen and $n$ is an integer of from 0 to 4 inclusive. As will be noted from the above general formula, the center phenyl group may be either substituted or unsubstituted. All of the compounds of our invention have a marked growth inhibitive effect against gram-negative organisms such as E. coli. In fact, the compounds of our invention have an activity which is equal to or better than that of hexachlorophene or hexachlorophene-trichlorocarbanalide against gram-negative organisms.

Antibacterial agents represented by the general formula given above may be prepared by reacting a Schiff's base with hypophosphorus acid. End products of higher purity are obtained whenever the Schiff's base (resulting from the condensation of an aryl amine and aromatic aldehyde) is prepared first followed by the reaction with hypophosphorus acid. It has been found unnecessary to isolate the Schiff's base prior to reaction with the acid. Thus, the general reaction leading to the formation of the preferred compounds is as follows:

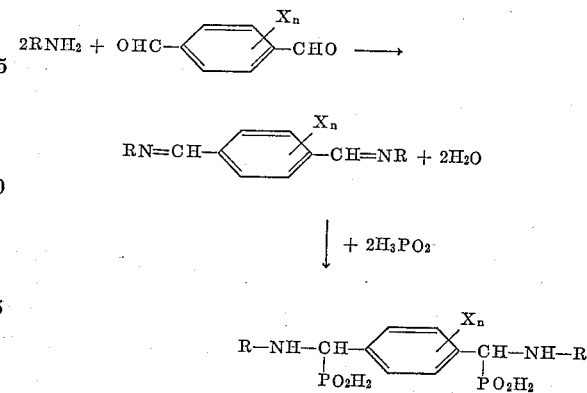

The Schiff's bases can be prepared by refluxing a substituted or unsubstituted terephthalic aldehyde with an aryl amine in benzene with azeotropic removal of water. The Schiff bases obtained from the halogenated anilines are reacted with aqueous hypophosphorus acid, utilizing ethanol as the reaction solvent. Yield and purity of the desired bis-amino phosphinic acids were both very high. In the case of the Schiff bases obtained from the hydroxyaniline and 1-naphthylamine, somewhat lower yields were obtained when ethanol was used as the reaction solvent along with a 50% aqueous hypophosphorus acid. We have discovered that using benzene as the reaction solvent and refluxing the reaction mixture with azeotropic removal of water has, in certain instances, increased both the yield and purity of certain specific bis-amino phosphinic acids.

Since bis-amino phosphinic acids of this invention are only slightly soluble in hot ethanol, this solvent can be used to precipitate the bis-amino phosphinic acids from their reaction mixture.

The bis-amino phosphinic acids are generally light yellow to white in color, microcrystalline solids, insoluble in water, moderately soluble in methanol, very slightly soluble in ethanol and most other usual organic solvents. The mono and di-alkali salts are very water soluble.

Reference may be had to the following illustrative examples for a more complete understanding of this invention.

*Example I*

A Schiff base having the formula:

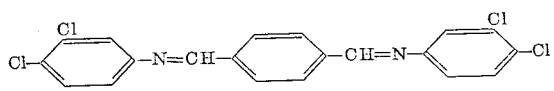

can be prepared from terephthalic aldehyde and 2,4-dichloroanaline as follows:

A mixture of terephthalic aldehyde (13.4 grams 0.10 m.), 3,4, dichloroanaline (32.4 grams 0.20 m.) and 100 ml. of benzene was refluxed for two and one-half hours with azeotropic removal of water using a Dean-Stark trap. At the end of the period, 3.5 ml. of $H_2O$ had collected in the trap. The mixture was cooled, diluted with 200 ml. of petroleum ether and allowed to stand in a freezer for four hours. The product was filtered, washed well with petroleum ether and dried. Weight: 40 grams (95% of theoretical). Melting point: 207–208° C.

*Example II* p,p' - Xylylene - $\alpha,\alpha'$-bis-(3,4-dichloroanalino)-$\alpha,\alpha'$-bis (phosphinc acid) can be prepared as follows:

21.1 grams of Schiff base prepared as described in Example I above was added to 75 ml. of ethanol. A 50% aqueous solution of hypophosphorus acid (13.2 grams 0.10 m.) was then added and the mixture allowed to reflux for two hours. A clear solution was obtained. This solution was permitted to stand in a freezer for 16 hours, followed by addition, with stirring, of 400 ml. of ice-cold water. The precipitate was filtered and dried in a vacuum desiccator. Weight of the product obtained 27.3 grams (98% of theoretical).

*Example III* p,p' - Xylylene - $\alpha,\alpha'$ - bis-(p-hydroxyanalino)-$\alpha,\alpha'$-bis (phosphinc acid) can be prepared as follows:

15.8 grams 0.05 m. of a bis-Schiff base prepared from terephthalic aldehyde and p-hydroxyaniline, was added to 100 ml. of benzene followed by the addition of 12.2 grams of hypophosphorus acid. The mixture was refluxed for four hours, with azeotropic removal of water using a Dean-Stark trap. At the end of this period, 6.5 ml. of water had been collected in the trap. The mixture was filtered while hot and 21.7 grams (96% of theory) of a light-orange powder was obtained.

*Example IV* p,p' - Xylylene - $\alpha,\alpha'$ - bis (m-chloroanilino)-$\alpha,\alpha'$-bis (phosphinic acid) is prepared as follows.

To a suspension of 17.7 grams (0.05 m.) of Schiff base (from terephthalic aldehyde and m-chloroaniline) in 75 ml. of ethanol was added 13.2 grams (0.10 m.) of 50% aqueous hypophosphorus acid. The mixture was refluxed for 3 hours. A cloudy mixture was obtained. This was cooled to 0° C. for 16 hours, followed by addition with stirring to 500 ml. of ice-cold water. The precipitate was filtered and dried. Yield: 23 grams (95%): Cl anal.: Calcd., 14.0%. Found, 14.65% (95.5% pure).

*Example V* p,p' - Xylylene - $\alpha,\alpha'$ - bis (O-hydroxyanilino)-$\alpha,\alpha'$-bis (phosphinc acid) can be prepared as follows:

To a solution of 12.65 grams (0.04 m.) of Schiff base (from terephthalic aldehyde and o-aminophenol) in 200 ml. of ethanol were added 10.55 grams (0.08 m.) of 50% aqueous hypophosphorus acid. The mixture was refluxed for 2½ hours, then cooled to 0° C. for 16 hours. The precipitate was filtered and dried. Yield: 14.5 grams. P anal.: Calcd., 13.8%. Found, 10.1% (73% pure).

*Example VI* p,p' - Xylylene - $\alpha,\alpha'$ - bis (1-napthylamino)-$\alpha,\alpha'$-bis (phosphinc acid) can be prepared as follows:

A mixture of 7.0 grams (0.018 m.) of Schiff base (from terephthalic aldehyde and 1-naphthylamine), 150 ml. of $C_6H_6$ and 4.82 grams (0.0364 m.) of 50% aqueous hypophosphorus acid was refluxed for 4½ hours with azeotropic removal of water. At the end of that period 2.5 ml. of water had been collected in the trap. The mixture was filtered while hot and the precipitate was slurried with benzene, filtered and dried. Yield: 9 grams (96%); P anal.: Calcd.: 12.0%. Found: 9.65% (80.5% pure).

*Example VII* p,p' - (2,3,5,6 - tetrachloroxylylene)-$\alpha,\alpha'$-bis-anilino-$\alpha$-$\alpha'$-bis (phosphinic acid) has been prepared as follows:

Tetrachloroterephthalic aldehyde was prepared by mixing a solution of 7.8 grams (0.016 m.) of p,p'-(tetrachloroxylylene)-bis-pyridinium chloride in 10 ml. of water with 5 grams of p-nitrosodimethylaniline (0.033 m.) in 100 ml. of ethyl alcohol. 16 ml. of 2 N KOH was added and the mixture stirred for 1½ hours at room temperature. The color of the mixture became red-brown and a yellow precipitate appeared. 80 ml. of 5 N $H_2SO_4$ was then added and the mixture extracted 5 times with ether. An additional amount of water was added to improve phase separation. The extract was then washed once with water and dried with $NA_2SO_4$ the ether evaporated and the resulting crystals filtered from the alcoholic residue. Total weight: 2.5 grams. Chlorine calculated: 52.2%. Found: 50.2%.

In preparing the Schiff base from the tetrachloroterephthalic aldehyde, a solution of 2 grams of the aldehyde and 1.4 grams of aniline in 20 ml. of benzene was boiled for 1 hour. Thereafter, 20 ml. of petroleum ether was added and the mixture chilled to −20° C. The precipitate obtained was filtered, washed with petroleum ether and dried. Yield: 2.6 grams (81%). M.P. 215–218° C.

To a suspension of 2.0 grams of the Schiff base prepared above in 15 ml. of ethyl alcohol was added 1.25 grams of 50% $H_3PO_2$. The mixture was boiled for thirty minutes and a clear solution was obtained. After an additional period of 4 hours of boiling, the mixture was chilled although no precipitate appeared. The cold solution was then added slowly to 100 ml. of $H_2O$ and a white precipitate was obtained which was filtered, washed and dried. Weight, 2.0 grams chlorine calculated: 25.70%. Found: 26.0%. The material is soluble in aqueous alkali and precipitates with mineral acids.

*Example VIII*

The antibacterial properties of the bis-aminophosphinic acids of our invention have been tested, and the minimum concentrations required to inhibit the growth of *S. aureus* and *E. coli* are as follows:

| R-NH-CH-⬡-CH-NH-R with PO₂H₂ groups and Xₙ | | Minimum Concentration (in p.p.m.) Required to Inhibit Growth of— | | | |
|---|---|---|---|---|---|
| | | S. Aureus | | E. Coli | |
| R | Xₙ ⬡ | Broth | Soap | Broth | Soap |
| Cl-⬡ | ⬡ | >100 | >100 | >100 | 100 |
| Cl,Cl-⬡ | ⬡ | 10 | 10 | >1,000 | 40 |
| HO-⬡ | ⬡ | ---------- | 10 | ---------- | 60 |
| ⬡-OH | ⬡ | ---------- | >10 | ---------- | 60 |
| naphthyl | ⬡ | ---------- | >10 | ---------- | 60 |
| ⬡ | Cl,Cl,Cl,Cl-⬡ | >100 | 10 | >500 | 200 |

While the invention has been disclosed in detail for purposes of illustration, it should be understood by those skilled in the art that many of the details may be varied without departing from the spirit and scope of our invention.

We claim:

1. A compound having the formula

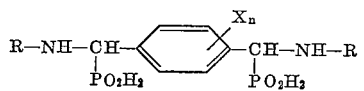

wherein R is selected from the group consisting of phenyl, naphthyl, substituted phenyl and substituted naphthyl and wherein the substituent is selected from the group consisting of nitro, hydroxyl and halogen, X is selected from the group consisting of nitro, hydroxyl and halogen and $n$ is an integer of from 0 to 4 inclusive.

2. p - Xylylene - bis - (phosphonous acid) - bis - (3,4-dichloroanilino).

3. p - Xylylene - bis - (phosphonous acid) - bis - (4-hydroxyanilino).

References Cited

UNITED STATES PATENTS

| | | | |
|---|---|---|---|
| 2,374,807 | 5/1945 | Dickey et al. | 260—500 |
| 1,607,113 | 11/1926 | Benda et al. | 260—500 |
| 3,134,738 | 5/1964 | Wood et al. | 252—106 |
| 3,118,842 | 1/1964 | Besser | 252—106 |
| 2,632,018 | 3/1953 | Kosolapoff | 260—461 |
| 2,286,794 | 6/1942 | Dickey et al. | 252—8.8 |
| 2,831,881 | 4/1958 | Bell et al. | 260—461 |
| 3,288,846 | 11/1966 | Irani et al. | 260—500 |

FOREIGN PATENTS 934,090  8/1963  Great Britain.

OTHER REFERENCES

Frank, "Chem. Rev.," vol. 61 (1961), pp. 389 to 394.
Houben-Weyl, "Methoden der Organischen Chemie," Band 12, part 1 (1963), pp. 229–300.

LEON ZITVER, *Primary Examiner.*

JULIAN S. LEVITT, *Examiner.*

J. E. EVANS, G. A. MENTIS, *Assistant Examiners.*